United States Patent [19]

Martell et al.

[11] Patent Number: 5,205,624
[45] Date of Patent: Apr. 27, 1993

[54] MATERIAL ISOLATION ENCLOSURE

[75] Inventors: Calvin J. Martell; Joel W. Dahlby; Bradford F. Gallimore, all of Los Alamos, N. Mex.; Bob E. Comer, Versailles, Mo.; Water A. Stone, Los Alamos; David O. Carlson, Tesugue, both of N. Mex.

[73] Assignee: The United States of America as represented by the United States Department of Energy, Washington, D.C.

[21] Appl. No.: 667,915

[22] Filed: Mar. 12, 1991

[51] Int. Cl.5 .............................................. A61G 11/00
[52] U.S. Cl. ....................................... 312/1; 160/84.1; 160/102
[58] Field of Search ..................... 312/1; 160/84.1, 102

[56] References Cited

U.S. PATENT DOCUMENTS 3,498,687 3/1970 Diccianni ................................. 312/1

Primary Examiner—Kenneth J. Dorner
Assistant Examiner—Gerald A. Anderson
Attorney, Agent, or Firm—Richard J. Cordovano; Paul D. Gaetjens; William R. Moser

[57] ABSTRACT

An enclosure similar to a glovebox for isolating materials from the atmosphere, yet allowing a technician to manipulate the materials and also apparatus which is located inside the enclosure. A portion of a wall of the enclosure is comprised of at least one flexible curtain. An opening defined by a frame is provided for the technician to insert his hands and forearms into the enclosure. The frame is movable in one plane, so that the technician has access to substantially all of the working interior of the enclosure. As the frame is moved by the technician, while he accomplishes work inside the enclosure, the curtain moves such that the only opening through the enclosure wall is the frame. In a preferred embodiment, where a negative pressure is maintained inside the enclosure, the frame is comprised of airfoils so that turbulence is reduced, thereby enhancing material retention within the box.

1 Claim, 3 Drawing Sheets

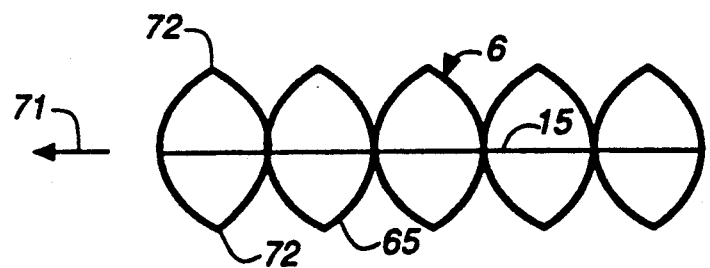
Fig.4
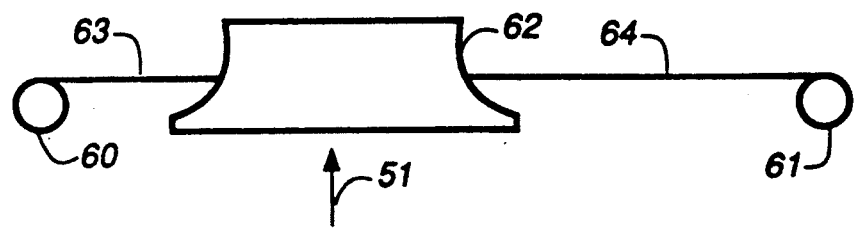
Fig.6
Fig.5
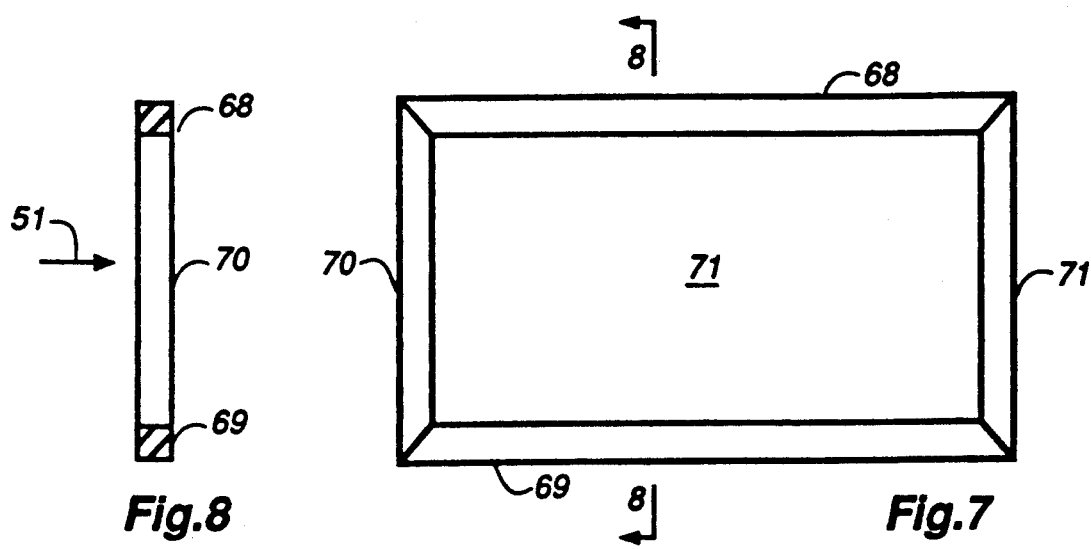
Fig.8  Fig.7

MATERIAL ISOLATION ENCLOSURE

This invention relates to the fields of heating, ventilating, and air conditioning (HVAC) and containment of hazardous materials. This invention is the result of a contract with the Department of Energy (Contract No. W-7405-ENG-36).

BACKGROUND OF THE INVENTION

Numerous substances must be isolated from the atmosphere and from contact with people, yet must be accessible for manipulation by humans. These materials include radioactive substances, toxic substances, and certain biological materials. Hoods and gloveboxes are often used to contain and isolate these materials when they must be handled, though certain highly radioactive materials must be isolated behind leaded glass as much as 50 cm thick and handled by remotely operated mechanical manipulators. The most common containment or isolation apparatus is a laboratory hood having an entirely open front and an exhaust fan connected to the rear or top of the hood. The fan causes air to flow into the hood from the open front toward the fan connection, thus tending to sweep material away from a technician facing the open front of the hood. A laboratory hood which is used when the degree of protection provided by the usual open-front hood is not sufficient has a glass or transparent plastic panel covering the face of the hood except for a portion which is open to allow a technician to insert his hands. Blocking a major portion of the hood face not only better isolates and protects the technician but allows the volume of air flowing into the hood to be decreased, thus decreasing the cost of the installation.

Gloveboxes are well known enclosures for isolating hazardous materials, particularly when radioactive materials must be handled. These boxes are completely sealed from the atmosphere and have gloves with long cuffs, or extensions, located inside the enclosure and connected to a wall of the enclosure. A small air flow through the box is usually maintained and both air entering the box and air leaving the box passes through HEPA filters. A technician inserts his hands and forearms into the cuffed gloves and then can manipulate materials and apparatus inside the box. Where the need for isolation is less critical, "open-front gloveboxes," or open-front containment boxes, may be used. Though the term "open-front glovebox" is inaccurate, it is commonly used. For example, a standard glovebox may be used for radioactive substances in the form of powders while an open-front glovebox is used for radioactive solutions. An open-front containment box is an enclosure having an opening without gloves attached to it through which a technician may insert his hands and, if necessary, his forearms to handle material within the box. The technician will normally be wearing protective clothing, such as gloves and a smock. An open-front glovebox is much more convenient to use than a conventional glovebox and its use allows a technician to work more rapidly. An open-front glovebox is normally maintained at a pressure slightly below atmospheric pressure by means of a fan which exhausts the air passing through the glovebox to the atmosphere. In most cases, a filter is provided at some point between the fan inlet and outlet to prevent toxic material which is pulled from the glovebox by the fan from entering the atmosphere.

In the manufacture of pharmaceuticals and electronic components such as chips, it is necessary to protect the product from airborne contamination. This is normally accomplished by working in "clean rooms" in which the air pressure is greater than atmospheric pressure so that air flows out of the rooms. The air provided to a clean room must be filtered and people entering a clean room must completely cover their normal clothing with smocks or "bunny suits" which do not shed particulate matter and often must wear face masks. For certain small scale operations, a containment box which is operated at a positive pressure by means of supplying clean air to it may be used.

The present invention is an improved material isolation enclosure, or improved open-front glovebox, or improved containment box, which is useful in either situation: where the material handled is toxic or where the material handled must be protected from atmospheric contamination. The invention will be explained primarily in terms of an enclosure connected to a ventilation system which maintains a negative pressure inside the containment box. Those skilled in the art will recognize that the invention is easily adapted to use of an enclosure which is operated under positive pressure. The present invention was developed in the course of design of a facility having several hundred open-front gloveboxes. The total amount of air flowing into several hundred conventional open-front gloveboxes requires a very large system of ductwork and fans. Also, all of this air must be passed through HEPA filters, which are extremely expensive, before being exhausted to the atmosphere. Use of the present invention will enable the air volume handled to be reduced by a factor of 3 or 5 or more. This allows much smaller ducts, fans, motors, and filters to be used. In the case of a clean room-type containment box, it can also be seen that the volume of air required to be supplied to the box and the required air handing apparatus will be greatly reduced by use of the present invention.

SUMMARY OF THE INVENTION

This invention is an enclosure similar to a glovebox for isolating materials from the atmosphere, yet allowing a technician to manipulate the materials and also apparatus which is located inside the enclosure. A portion of a wall of the enclosure is comprised of at least one flexible curtain. An opening defined by a frame is provided for the technician to insert his hands and forearms into the enclosure. The frame is movable, in one plane, so that the technician has access to substantially all of the working interior of the enclosure. As the frame is moved by the technician, while he accomplishes work inside the enclosure, the curtain moves such that the only opening through the enclosure wall is the frame. In a preferred embodiment, where a negative pressure is maintained inside the enclosure, the frame is comprised of airfoils so that turbulence is reduced, thereby enhancing material retention within the box.

BRIEF SUMMARY OF THE DRAWINGS

FIGS. 1-7 are schematic representations of the apparatus of the invention. They are not drawn to scale and include only components useful and necessary for understanding the invention; conventional components such as screws and gaskets are not shown.

FIG. 1 is a front view of a three section containment box, or "glovebox," utilizing the present invention.

FIGS. 2 and 3 are partial sections taken as shown by the section arrows on FIG. 1 and depict an access frame which is an element of a preferred embodiment of the invention.

FIG. 4 depicts a preferred curtain which is used in the present invention in top view.

FIG. 5 shows a portion of a folding curtain in top view.

FIG. 6 depicts an access frame, curtains, and curtain retention rollers in top view.

FIG. 7 is a front view of an access frame without attached curtains.

FIG. 8 is a section view of the access frame of FIG. 7 taken as shown by the section arrows of FIG. 7.

DETAILED DESCRIPTION OF THE INVENTION

Practice of the present invention enhances material retention within an enclosure by a factor greater than ten, as shown by a test using a prototype box, which is described below. When the invention is used with an open-front glovebox having a width of about 9 feet, a technician performing operations within the box has nearly the same amount of freedom as when the box is not fitted with the inventive apparatus and the air handling requirement is cut to one-third of its previous amount. The invention has also been used with boxes having a total width of 15 feet, reducing air handling to 1/5 of the normal requirement.

Figure 1:
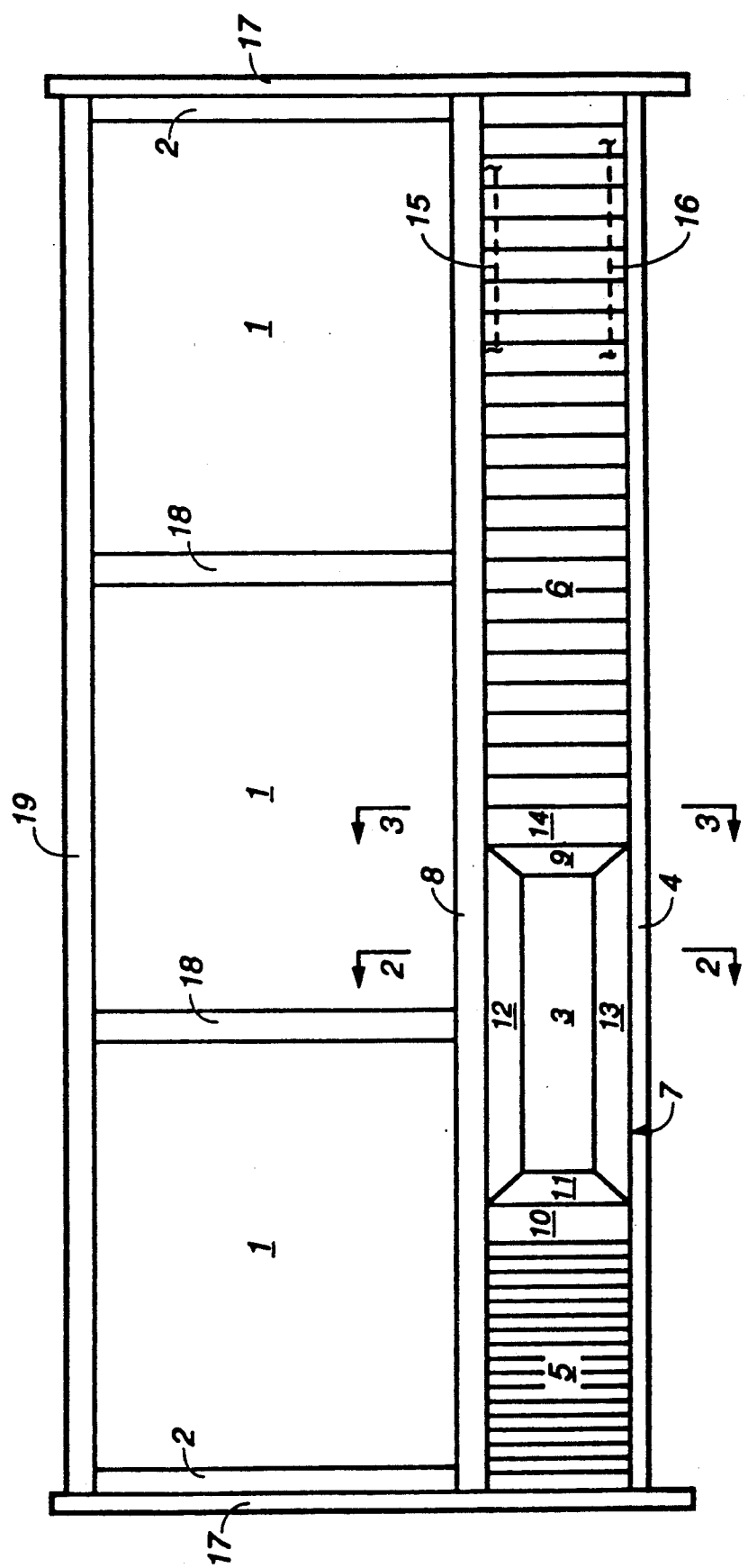

A prototype containment box similar to the embodiment shown in FIGS. 1-4 was built. FIG. 1 depicts an embodiment of the invention which is a three-section box which has metal structural framing members 2, 8, 18, and 19 surrounding three transparent plastic panels denoted by 1. Reference number 17 identifies the end panels of the containment box, which are extended beneath the box to function as supports along with additional support legs (not shown) attached to the bottom panel (not shown) of the box. The top panel of the enclosure is located behind structural member 19 and is not visible in this front view. The bottom panel (not shown) is located behind guide member 4. Also not shown in this view is the back panel, which contains a connection for an exhaust fan. In a conventional open-front glovebox the area below the lower edge of the transparent plastic is open, so that a technician may insert his hands into the box to manipulate material and apparatus located inside the box. This open area may be called an access zone. Each section of the box is about 3 ft. wide, so that the access zone is about 9 ft. wide. The height of the access zone is about 8 inches. The access zone of the containment box of FIG. 1 is covered by two curtains, 5 and 6, and contains access frame 7, which is comprised of access frame members 9, 11, 12, and 13. A technician may insert his hands into the enclosure through access space 3, which is defined by access frame 7. Reference nos. 10 and 14 denote cover plates which are attached to the access frame and to which ends of curtains 5 and 6 are attached.

Figure 2:
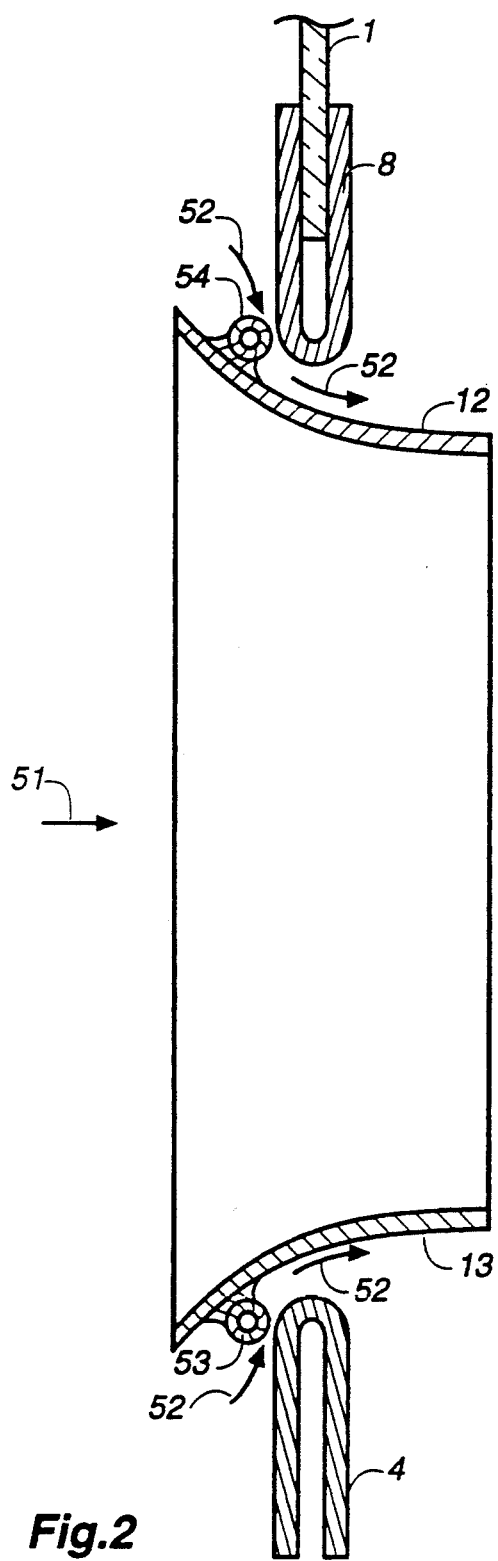
Figure 3:
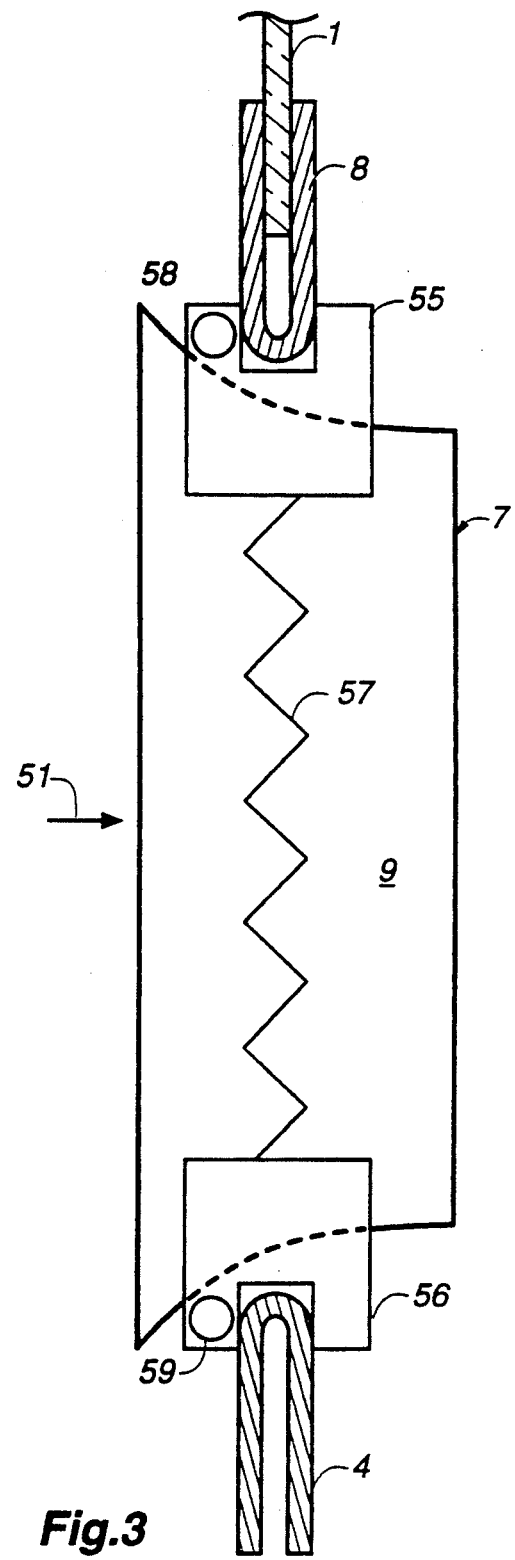

FIGS. 2 and 3 are sections taken as shown by the section arrows of FIG. 1. Note that slide blocks, which are described below, are omitted from FIG. 2. It can be seen from FIGS. 1-3 that guide member 4 and structural member 8 define the top and bottom of the box access zone. The ends of the access zone are defined by end panels 17. Access frame members 12 and 13 of access frame 7 have an airfoil shape, as can be seen from FIG. 2. Use of an airfoil shape is a preferred embodiment in order to minimize turbulence at the interior perimeter of the access frame. Access frame members 9 and 11 have the same airfoil shape as the top and bottom frame members. FIG. 3 shows access frame side member 9 and apparatus attached to the side member which is located behind cover plate 14. Slide blocks 55 and 56 are located in front of access frame side member 9 and are of a polymeric material which has a low coefficient of friction. The blocks have grooves which partially enclose members 4 and 8 and they are positioned to slide along the length of members 4 and 8. The apparatus is designed so that the slide blocks are movable in a vertical direction and spring 57 forces the slide blocks against members 4 and 8. Slide blocks 55 and 56 are located behind cover plate 14. The means by which the slide blocks and spring 57 are retained and fastened to frame member 9 are not shown. An identical set of slide blocks, spring, and retaining hardware is located behind cover plate 10 and fastened to frame member 11 in the same manner.

Access frame 7 may be moved in a side to side manner within the access zone so that access is readily available to various portions of the box. A technician standing in front of the box and having his hands inside it may move the frame by simply moving side-ways: his wrists or forearms bear against a side of the access frame and cause it to move as the technician moves. Thus, by means of the invention, the technician has access to the entire box as if it were a conventional open-front box while the opening of the box is much smaller. When access frame 7 is moved to its extreme left position (when facing the box) flexible curtain 5 is at its minimum width and flexible curtain 6 is at its maximum extension or width. When the access frame is moved to its extreme right portion, the width of curtain 6 will be at a minimum and that of curtain 5 will be at its maximum. In FIG. 1, the curtain is not at its minimum width and the access frame could be moved further to the left. Curtain 6 is attached at one end to access frame member 9 and at the other end to right end panel 17. Similarly, curtain 5 is attached to access frame member 11 and left end panel 17 of the enclosure. The curtains overlap guide member 4 and structural member 8 by a small amount at the top and bottom edges of the curtains. Since the pressure inside the box is negative, the top and bottom of the curtains tend to be pressed against the two members.

FIG. 4 depicts in top view a portion of a preferred flexible curtain 6 which bears the trade name DUETTE and is manufactured by Hunter Douglas Inc. of Broomfield, Colo. The curtain is comprised of a plurality of vertically positioned modified cylindrical sections; reference no. 65 denotes one of the sections. Each section has two vertical creases or folds 72 to facilitate expansion and retraction of the curtain. A horizontal nylon cord passes through the curtain near its top as shown by reference no. 15 in FIGS. 1 and 4. Only a portion of cord 15 is shown. However, it extends across the entire access zone of the box and has its ends attached to end panel 17. A similar cord is used near the bottom of the curtain, as indicated by the portion of cord 16 shown in FIG. 1. These cords stabilize the curtain and help ensure that it folds neatly into its retracted position. When the curtain is extended in the direction shown by arrow 71, each cell, such as cell 65, becomes elongated along the length of the cords. When the curtain is retracted, each cell collapses, folding along creases 72 so that the curtain occupies a minimum amount of space along the length of cords 15 and 16. As mentioned, cords 15 and 16 extend horizontally across the entire width of the box. In FIG. 2, guides 53 and 54 are shown attached to frame members 12 and 13; cords pass through these guides. In FIG. 3 holes 58 and 59 are shown in slide blocks 55 and 56 for passage of the cords. Cord 15 passes through guide 54 and hole 58. Cord 16 passes through guide 53 and hole 59.

In a preferred embodiment where the access frame members have airfoil shapes and where the box is at negative pressure, a minor amount of air passes into the box around the top and bottom of the access frame. Referring to FIG. 2, most of the air entering the box passes through the access frame as shown by arrow 51. Arrows 52 show the paths of air entering the box above top access frame member 12 and bottom access frame member 13. The air flows through gaps between members 4 and 8 and the access frame members. In the prototype box, the gap at top was 0.375 in. and the gap at the bottom was 0.25 in. Cover plates 10 and 14 can be attached so that there is also a gap adjacent to the vertical members 9 and 11, if desired. It is possible to build a box where the gaps are very small so that a minimum amount of air enters the box through the gaps. However, it has been found that more than a minimum amount of air should enter around the top and bottom of the frame to prevent turbulence at the top and bottom frame members which would cause matter to escape from the box.

Some dimensions of the prototype access frame are shown in FIG. 2. The exterior height of the frame is 7.0 in. and the inside height is 4.5 in. It is desirable to use a larger inside height (of about 7 inches), but the prototype utilized an existing box having dimensions which were not compatible with the larger height. The corresponding lengths, which are not shown in the drawing, are 33.5 in. for the exterior length and 31.0 in. for the inside length. The width of the frame is 2.63 in. The desired air velocity through the access frame is about 125 feet/min. In the initial testing of the prototype, a velocity of 125 ft/min. though the frame was established by adjustment of a damper. A TSI model 1650 hot wire anemometer was used to measure air velocity. Flows through the upper and lower gaps were measured and, converted to volumetric flow, were about 4 ACFM through the upper gap and about 1.3 ACFM through the lower gap. It should also be noted that a small amount of air flows into the box around the edges of the curtain.

FIG. 5 is a top view of a folding curtain having individual panels such as panel 67 which fold along fold lines such as shown by reference no. 66. FIG. 6 is a top view of an access frame 62 like that shown in FIGS. 1-3 and flat curtains 63 and 64 which are attached to the frame and to rollers 60 and 61. As the access frame is moved to the left, for example, curtain 63 will "roll up" onto roller 60 in the manner of a window shade while curtain 64 will unroll from roller 61. FIGS. 7 and 8 depict a simple access frame which does not have an airfoil shape. FIG. 8 is a section view taken as shown by the section arrows of FIG. 7. The frame is comprised of members 68. 69. 70, and 71 and the access space is shown by reference no. 71. Arrow 51 depicts the direction of air flow through the access frame.

A test of the effectiveness of the invention in reducing escape of small particulate matter was conducted on the prototype box described above. An aerosol generator was used to provide an aerosol inside the box. The aerosol substance was di(2-ethylhexyl) sebacate. An aerosol dispersion tube having a number of holes was placed on the bottom of the box such that it was parallel to the face of the box and 12 inches from the access zone. An aerosol was produced when the inventive access frame and curtain were installed and with the frame and curtain removed. In each case, dampers in the ducts carrying air away from the glovebox were adjusted so that the air velocity flowing into the box through the access zone (without frame and curtains) and through the access space (frame and curtains installed) were 125 ft./min. A Particle Measuring Systems model LAS-X spectrometer which counts and sizes single particles was used to collect samples at a point in the center of the access zone (with the access frame centered when it is installed) and in the breathing zone for a technician working at the box at a point 5 ft. from the floor and 6 in. from the box. These are in the ambient concentration column of the Table. The challenge concentration figures were obtained from measurements using the spectrometer taken in the aerosol distribution conduit. Test results are shown in the concentration columns of the Table in number of particles per cubic cm. The protection factor is the challenge particle concentration divided by the ambient particle concentration at the measurement point in the breathing zone or the access zone.

TABLE

| | Challenge Concentration | Ambient Concentration | Protection Factor |
|---|---|---|---|
| Without invention | | | |
| Access Zone | $5.7 \times 10^7$ | 1000 | $0.57 \times 10^5$ |
| Breathing Zone | $5.7 \times 10^7$ | 600 | $0.95 \times 10^5$ |
| With Invention | | | |
| Access Zone | $1.8 \times 10^7$ | 20 | $9.0 \times 10^5$ |
| Breathing Zone | $1.8 \times 10^7$ | 16 | $11 \times 10^5$ |

It can be seen that the practice of the invention increases the protection factor by greater than an order of magnitude. The tests were conducted under near ideal conditions in that there was no technician working in the box, no apparatus in the box, and no apparent cross drafts in the room.

There are numerous methods of supporting the access frame and providing guides for it so that it can be moved from side to side, all of which are intended to be included within the scope of this invention. Similarly, the configuration of the curtains and the box can be varied. Varying amounts of air will flow into the box around the edges of the curtains, depending on the particular configuration used. In general, it is not necessary to prevent all air from flowing into the box around the curtain perimeter.

What is claimed is:

1. An enclosure for isolating material from the atmosphere comprising:
    a. an access zone;
    b. an access frame which is capable of being moved to a plurality of locations within said access zone, said access frame having an access space through which an operator may insert his hands to manipulate material which is within said enclosure, where said access frame is comprised of members having an airfoil shape, which members are disposed to minimize turbulence at the perimeter of the access space;

c. means for exhausting air from said enclosure; thereby causing air to flow into the enclosure;

d. a gap at the exterior perimeter of said access frame to provide a path for air flow into the enclosure, where a minor portion of the air flow into the enclosure is through said gap and a major portion of the air flow into the enclosure is through said access space in the access frame; and e. at least one flexible curtain which is disposed such that it covers all of said access zone not occupied by said access frame and said gap, at all times, including times when said access frame is being moved.

* * * * *